Feb. 17, 1970  E. J. DEY ET AL  3,495,643
NUT ASSEMBLY
Filed July 1, 1968
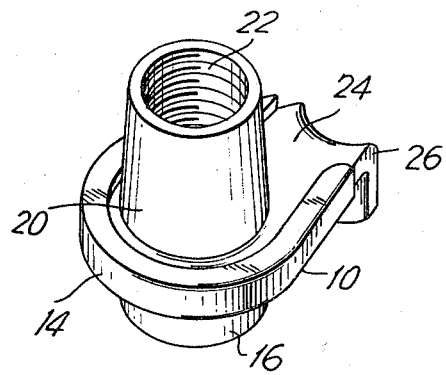
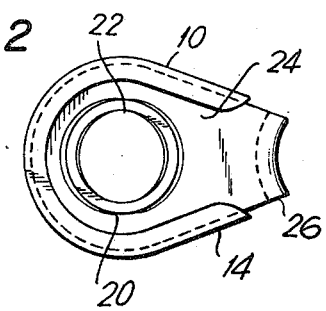
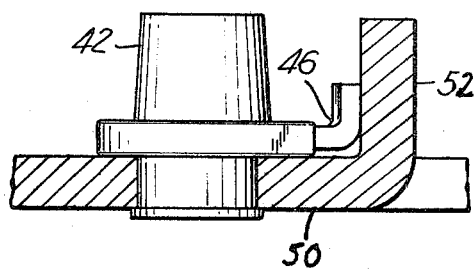
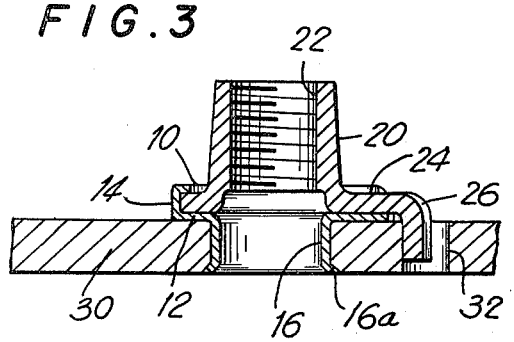
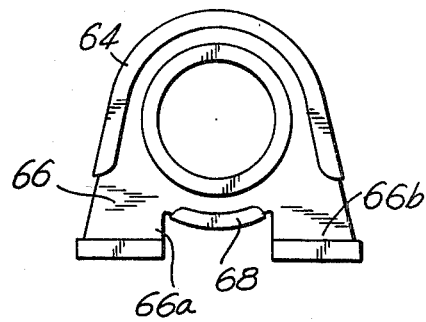
INVENTORS
ERVIN J. DEY
JOSEPH H. WILKENS
BY Andrew L. Dey
ATTORNEY

3,495,643
NUT ASSEMBLY

Ervin J. Dey, Santa Fe Springs, Calif., and Joseph H. Wilkens, Hatboro, Pa., assignors to Standard Pressed Steel Co., Jenkintown, Pa., a corporation of Pennsylvania
Filed July 1, 1968, Ser. No. 741,467
Int. Cl. F16b 39/00
U.S. Cl. 151—41.74                        6 Claims

ABSTRACT OF THE DISCLOSURE

A two-piece nut assembly wherein a nut member is carried by a retainer skirt which, in turn, is adapted for attachment to a workpiece. The nut member is provided with a hook extension adapted to bear against a surface of the workpiece so that as a mating bolt is turned into the threaded bore of the nut member, the nut member is restrained from rotating.

---

The present invention relates, in general, to fastening devices and, in particular, to a nut assembly provided with a restrainer which prevents the nut from rotating as a mating bolt or screw is turned into the nut.

A common problem in the installation of certain threaded fastener systems is the lack of access to either the male or female member as the joint is being tightened. This is known as a "blind" or "semi-blind" application, in that, a workman installing one part of the two-part system cannot see or get to the second part as the fastener system is being installed. As a result, a common approach to solving the problems of blind or semi-blind applications has been to pre-mount one of the fasteners and to provide means for preventing this fastener from rotating when it is engaged by a mating fastener during installation.

Various techniques and devices have been suggested in the past for overcoming the problems associated with blind or semi-blind nut applications. Generally, the prior art suggestions are deficient for one or more reasons. Certain of these devices are unduly complex in construction and too costly to manufacture, thereby rendering their use prohibitive. Others, because of their configuration, lack versatility for a sufficiently wide variety of applications. Probably the most serious shortcoming of many of the devices suggested by the prior art is that the mounting structure to which the blind or semi-blind fastener is secured is affected in an adverse manner by the means employed in securing the fastener to this structure. Typical of the undesirable effect on the mounting structure is the inducement of stress concentrations. This problem is of particular concern when the mounting structure is made of a relatively thin material or subjected to high stresses.

Accordingly, it is an object of the present invention to provide a new and improved nut assembly arranged to be secured to a mounting structure for blind or semi-blind applications.

It is a further object of the present invention to provide a nut assembly for blind or semi-blind applications which overcomes the shortcomings and limitations of presently available, comparable devices.

These objects, as well as others, are achieved in accordance with the present invention by providing a retainer skirt having a base surrounded by a channel extending around a selected length of the periphery of the base to provide an opening in the channel. A hole is provided in the base of the retainer skirt and a cylindrical sleeve, aligned with this hole, extends away from the base from the side of the base opposite from the channel. A nut member is positioned within the retainer skirt with the threaded bore of the nut member substantially aligned with the hole in the retainer skirt. Surrounding the bore of the nut member is a flange which is fitted within the channel of the retainer skirt. The flange of the nut member is provided with a hook extension which passes through the opening in the channel of the retainer skirt and is bent normal to the flange at a point beyond the periphery of the retainer skirt.

For a better understanding of the present invention, together with other and further objects thereof, reference is made to the following description, taken in connection with the accompanying drawing, and its scope will be pointed out in the appended claims.

Referring to the drawing:

FIGURE 1 is a perspective view of a nut assembly constructed in accordance with the present invention;

FIGURE 2 is a plan view of the nut assembly illustrated in FIGURE 1;

FIGURE 3 is a vertical section of the nut assembly of FIGURES 1 and 2 mounted on a support structure;

FIGURE 4 is a vertical section showing a second embodiment of a nut assembly constructed in accordance with the present invention mounted on a support structure; and FIGURE 5 is a plan view of a third embodiment of a nut assembly constructed in accordance with the present invention.

Referring to FIGURES 1, 2 and 3, a nut assembly constructed in accordance with the present invention includes a retainer skirt 10 having a base 12 and a channel 14 extending around a selected length of the periphery of base 12. As is clearly illustrated in FIGURE 3, for this embodiment of the invention, channel 14 has a C-shaped cross-section.

Retainer skirt 10 is provided with a cylindrical sleeve 16 which extends away from base 12 of the retainer skirt in a direction opposite from channel 14. Sleeve 16 is aligned with a hole in the retainer skirt located approximately at the center of base 12. Preferably, base 12, channel 14 and sleeve 16 of the retainer skirt are an integral unit formed from sheet material, for example, by progressive die techniques.

Positioned within retainer skirt 10 is a nut member 20. The threaded bore 22 of nut member 20 is surrounded by a flange 24 fitted within channel 14 of the retainer skirt and disposed normal to the axis of the threaded bore. Flange 24 has a hook extension 26 extending through an opening in channel 14 of the retainer skirt. This hook extension is bent beyond the periphery of the retainer skirt in the direction normal to flange 24. For the embodiment of the invention illustrated in FIGURES 1, 2 and 3, the bent portion of hook extension 26 extends away from flange 24 in a direction opposite from threaded bore 22.

The nut assembly may be mounted on a support structure 30, as illustrated in FIGURE 3, by passing cylindrical sleeve 16 of the retainer skirt through a preformed hole in structure 30. Next, the lower edge of sleeve 16 is bent into a flange 16a to retain the retainer skirt and, therefore, nut element 20 on support structure 30. Although support structure 30 in FIGURE 3 is shown with a countersunk hole so that sleeve 16 does not extend beyond the lower surface of the support structure, the assembly may be arranged with the sleeve protruding from the support structure with flange 16a bent against the lower surface of the support structure.

A second hole 32 is provided in support structure 30 to receive hook extension 26, whereby rotation of nut element 20 is limited. Alternatively, the hook extension may be arranged to bear against an edge of the support structure upon which the assembly is mounted. In order that hook extension 26 enter hole 32 or bear against an edge of the support structure, the hook extends beyond the bottom surface of base 12 of the retainer skirt. As is clearly illustrated in FIGURE 2, the bent portion of hook extension 26 is curved relative to an axis normal to flange 24. This construction provides more strength to the hook extension so that it has less tendency to bend and the curvature also provides a more accurate fit against hole 32 into which the hook extension is inserted.

The shape and peripheral extent of channel 14 are selected to retain nut element 20 in retainer skirt 10 during handling of the assembly and the securing of the assembly to a support structure. This result is achieved by providing a channel having arc length which is greater than 180°, whereby the cross dimension of flange 24 is greater than the opening provided in channel 14. The particular channel illustrated in FIGURES 1 and 2 includes a circular first portion having an arc length of 180° with second and third portions which are straight and extend inwardly toward each other.

FIGURE 4 illustrates a second embodiment of a nut assembly constructed in accordance with the present invention. The major difference between this embodiment and the one illustrated in FIGURES 1, 2 and 3 is that hook extension 46 in FIGURE 4 extends away from the flange of the nut element in the same direction as does threaded bore 42. As a result, in this embodiment the hook extension is adapted to bear against a flange 52 of a support structure 50, in contrast to bearing against a hole in the support structure such as is illustrated in FIGURE 3 or an edge of the support structure.

FIGURE 5 illustrates a third embodiment of a nut assembly constructed in accordance with the present invention. This embodiment differs from the two previously described in that hook extension 66 has two prongs 66a and 66b and a second channel section 68 has been added to the retainer skirt. The prongs 66a and 66b are arranged to pass through the openings formed by the confronting edges of channels 64 and 68 of the retainer skirt. As a result of this arrangement of the retainer skirt, the arc length of the curved section of channel 64 may be less than 180°. Like the assembly in FIGURE 4, prongs 66a and 66b are bent to extend in the same direction as does the threaded bore.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A joint comprising:
   a structural member having a first hole extending from a first surface of said member to a second surface of said member, the end of said hole opening into said second surface having an enlarged cross-section relative to the cross-section of the end of said hole opening in said first surface, said structural member also having an abutment surface;
   a retainer skirt having a base with a hole extending from a first side of said base to a second side of said base, said skirt also having a channel on said first side of said base extending around a selected length of the periphery of said base to provide an opening in said channel, said skirt further having a cylindrical sleeve aligned with said hole and extending away from said second side of said base normal to said base, said skirt positioned on said structural member with said sleeve extending through said first hole in said structural member but not beyond said second surface of said structural member and said second side of said base bearing against said first surface of said structural member, the end of said sleeve remote from said base of said skirt bearing against said end of said hole having said enlarged cross-section;
   and a nut member positioned within said retainer skirt and having a threaded bore substantially aligned with said hole in said retainer skirt, said threaded bore surrounded by a flange fitted within said channel of said retainer skirt and disposed normal to the axis of said threaded bore, said flange having a hook extension passing through said opening in said channel of said retainer skirt and bent beyond the periphery of said retainer skirt normal to said flange, the width and length of said hook extension and the size of said opening in said channel of said skirt selected to cause said bent portion of said hook extension to bear against said abutment surface of said structural member upon rotation of said nut member before the edges of said hook extension can bear against the edges of said channel which define said opening in said channel.

2. A joint according to claim 1 wherein said abutment surface of said structural member is the surface of a second hole in said structural member and said bent portion of said hook extension is curved to fit within said second hole.

3. A joint according to claim 1 wherein said nut member has a body portion extending away from the surface of said flange remote from said base of said retainer skirt and said threaded bore extends through said body portion, said bent portion of said hook extension extending away from said flange in the same direction as does said body portion.

4. A nut assembly comprising:
   a retainer skirt having a base with a hole extending from a first side of said base to a second side of said base, said skirt also having first and second channels on said first side of said base and spaced to form a pair of openings between confronting edges of said channels, said skirt further having a cylindrical sleeve aligned with said hole and extending away from said second side of said base normal to said base;
   and a nut member positioned within said retainer skirt and having a threaded bore substantially aligned with said hole in said retainer skirt, said threaded bore surrounded by a flange fitted within said channels of said retainer skirt and disposed normal to the axis of said threaded bore, said flange having a hook extension composed of a pair of spaced prongs extending in generally the same direction and passing through said pair of openings between said channels of said retainer skirt, said spaced prongs bent beyond the periphery of said retainer skirt normal to said flange.

5. A nut assembly according to claim 4 wherein the arc length of said first channel is less than 180°.

6. A nut assembly according to claim 4 wherein said nut member has a body portion extending away from the surface of said flange remote from said base of said retainer skirt and said threaded bore extends through said body portion, said bent portions of said hook extension extending away from said flange in the same direction as does said body portion.

References Cited

UNITED STATES PATENTS

| 1,985,272 | 12/1968 | Adams | 151—33 |
| 2,243,923 | 6/1941 | Swanstrom | 151—41.76 |
| 2,567,864 | 9/1951 | Becker | 151—41.74 |
| 3,020,947 | 2/1962 | McKelvey | 151—41.75 |
| 3,036,673 | 5/1962 | Santerre | 151—41.74 |

FOREIGN PATENTS 483,089   4/1938   Great Britain.

EDWARD C. ALLEN, Primary Examiner

U.S. Cl. X.R.

151—41.76